(12) United States Patent
Xia et al.

(10) Patent No.: US 10,594,396 B1
(45) Date of Patent: Mar. 17, 2020

(54) SYSTEMS AND METHODS FOR WEIGHTED COMBINATION OF QUADRANT PHOTODETECTOR OUTPUT FOR BEAM TRACKING

(71) Applicant: Facebook, Inc., Menlo Park, CA (US)

(72) Inventors: Chiyun Xia, Agoura Hills, CA (US); Harvard Keese Harding, Jr., Simi Valley, CA (US); Chien-Chung Chen, Thousand Oaks, CA (US); Ferze Daligues Patawaran, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/986,148

(22) Filed: May 22, 2018

(51) Int. Cl.
*H04B 10/112* (2013.01)
*H04B 10/60* (2013.01)
*G01J 1/44* (2006.01)
*G01J 1/04* (2006.01)
*G01J 1/42* (2006.01)

(52) U.S. Cl.
CPC ........ *H04B 10/1121* (2013.01); *G01J 1/0414* (2013.01); *G01J 1/0433* (2013.01); *G01J 1/0448* (2013.01); *G01J 1/4257* (2013.01); *G01J 1/44* (2013.01); *H04B 10/60* (2013.01); *G01J 2001/4242* (2013.01)

(58) Field of Classification Search
None
See application file for complete search history.

(56) References Cited

U.S. PATENT DOCUMENTS

| | | | |
|---|---|---|---|
| 7,725,253 B2 | 5/2010 | Foxlin | |
| 8,174,693 B1* | 5/2012 | Matthews | G01J 3/0205 250/208.2 |
| 9,813,151 B2 | 11/2017 | Kingsbury | |
| 2004/0042798 A1* | 3/2004 | Kehr | H04B 10/1123 398/135 |
| 2006/0024061 A1 | 2/2006 | Wirth | |
| 2007/0081695 A1 | 4/2007 | Foxlin | |
| 2012/0302862 A1* | 11/2012 | Yun | A61B 5/0075 600/398 |
| 2016/0043800 A1 | 2/2016 | Kingsbury | |

OTHER PUBLICATIONS

Murphy, Robert J. et al., "A conical free space optical tracking system for fading channels," Free-Space Laser Communications IX, Ed. Arun K. Majumdar & Christopher C. Davis, San Diego, CA, USA: SPIE (The International Sociaty for Optical Engineering), 74640P-78. (Accessed at <<dspace.mit.edu/openaccess-disseminate/1721.1/52719>>).

* cited by examiner

*Primary Examiner* — David W Lambert
(74) *Attorney, Agent, or Firm* — FisherBroyles, LLP

(57) ABSTRACT

The disclosed system may include (1) an optical element that receives an optical beam, (2) a wide field-of-view (FOV) quadrant photodetector that receives, from the optical element, first light originating from the optical beam, (3) a narrow FOV quadrant photodetector that receives, from the optical element, second light originating from the optical beam, and (4) a controller that controls an orientation of the optical element during at least a period of time based on a weighted combination of (a) output of the wide FOV quadrant photodetector in response to the first light, and (b) output of the narrow FOV quadrant photodetector in response to the second light. Various other systems, methods, and computer-readable media are also disclosed.

20 Claims, 11 Drawing Sheets

PAT Mode Table
900

| PAT Mode | Centroid Location | Control Loop Functions |
|---|---|---|
| Scan Mode 902 | No Beacon Detected/Sync (While Beacon in Zone 2 or External to Zone 2); Advance upon Beacon Sync Using Wide FOV (Zone 2) | Conical Scan Active; Control Based on Centroid Location OFF; Integrator OFF |
| Seek Mode 904 | Beacon Detected in Wide FOV (Zone 2 or Zone 1); Advance upon Detection of Centroid in Narrow FOV Linear Range (Zone 0) | Conical Scan Freeze; Control Based on Centroid Location ON (Zone 2 or Zone 1); Integrator OFF |
| Settle Mode 906 | Beacon Detected in Narrow FOV Linear Range (Zone 0); Advance upon Centroid Remaining in Narrow FOV Linear Range for Some Time Period | Conical Scan Freeze; Control Based on Centroid Location ON (Zone 0); Integrator ON |
| Tracking Mode 908 | Beacon Remaining in Narrow FOV Linear Range (Zone 0); Regress Based on Loss of Sync in Narrow FOV Linear Range | Conical Scan Ramp Down; Control Based on Centroid Location ON (Zone 0); Integrator ON |

*FIG. 9*

SYSTEMS AND METHODS FOR WEIGHTED COMBINATION OF QUADRANT PHOTODETECTOR OUTPUT FOR BEAM TRACKING

BACKGROUND

In some traditional free space optical communication systems in which a relatively narrow optical beam serves as a communication link between two locations (e.g., an orbital space vehicle and a ground station), an optical beacon signal may be employed to facilitate accurate alignment of a receiving device with respect to a transmitting device for proper reception of an associated optical communication beam that carries communication data. Additionally, such as in cases in which the receiving device is located on an orbital or airborne vehicle, the optical beacon signal may also be employed to provide some suppression of vibrations imparted by the vehicle on the receiving device. In some examples, the optical beacon signal may be integrated in, or separate from, but in proximity with, the optical communication beam.

In some cases, the receiving system may control the orientation of one or more fine steering mirrors (or, alternately, fast steering mirrors (FSMs)) or other optical components designed to receive the optical beacon signal using a beam location detection device. In addition, the beam location detection device may employ a quadrant photodetector that provides some indication of the location of the optical beacon signal within the field of view (FOV) of the quadrant photodetector.

Quadrant photodetectors that may be deemed suitable for optical beacon signals in such cases may exhibit a range of FOVs. However, while quadrant photodetectors with relatively wide FOVs may initially be favored over relatively narrow FOV quadrant photodetectors to facilitate detection of the optical beacon signal over a greater FOV, wide FOV quadrant photodetectors typically exhibit greater atmospheric scintillation noise than narrow FOV quadrant photodetectors, possibly rendering their outputs less accurate.

SUMMARY

As will be described in greater detail below, the instant disclosure describes systems and methods for weighted combination of quadrant photodetector output for beam tracking. In one example, a system may include (1) an optical element that receives an optical beam, (2) a wide field-of-view (FOV) quadrant photodetector that receives, from the optical element, first light originating from the optical beam, (3) a narrow FOV quadrant photodetector that receives, from the optical element, second light originating from the optical beam, and (4) a controller that controls an orientation of the optical element during at least a period of time based on a weighted combination of (a) output of the wide FOV quadrant photodetector in response to the first light; and (b) output of the narrow FOV quadrant photodetector in response to the second light. In some embodiments, the weighted combination may include a constant ratio of the output of the wide FOV quadrant photodetector to the output of the narrow FOV quadrant photodetector over the period of time. In other examples, the weighted combination may include a normalized combination ranging, over the period of time, from 100 percent of the output of the wide FOV quadrant photodetector and 0 percent of the output of the narrow FOV quadrant photodetector, to 0 percent of the output of the wide FOV quadrant photodetector and 100 percent of the output of the narrow FOV quadrant photodetector. Further, in such examples, the weighted combination may change linearly over the period of time.

In some embodiments, the controller may control the orientation of the optical element based on the weighted combination when the output of the narrow FOV quadrant photodetector indicates a centroid of the second light is located outside a linear response range of the narrow FOV quadrant photodetector. In other examples, the controller may control the orientation of the optical element based on the weighted combination when (1) the output of the narrow FOV quadrant photodetector indicates a centroid of the second light is located outside a linear response range of the narrow FOV quadrant photodetector, and (2) a sign of the output of the narrow FOV quadrant photodetector and a sign of the output of the wide FOV quadrant photodetector are the same.

In some examples, the controller may control the orientation of the optical element without the output of the wide FOV quadrant photodetector when the output of the narrow FOV quadrant photodetector indicates a centroid of the second light is located within a linear response range of the narrow FOV quadrant photodetector. Also in some examples, the linear response range of the wide FOV quadrant photodetector is less than 20 microradians. In other embodiments, the controller may control the orientation of the optical element without the output of the wide FOV quadrant photodetector when (1) the output of the narrow FOV quadrant photodetector indicates detection of a centroid of the second light, and (2) a sign of the output of the narrow FOV quadrant photodetector and a sign of the output of the wide FOV quadrant photodetector are different.

In some embodiments, the controller may control the orientation of the optical element without the output of the narrow FOV quadrant photodetector when the output of the narrow FOV quadrant photodetector indicates no detection of a centroid of the second light. The system, in some examples, may also include a detection circuit that detects a modulation of the optical beam, and the controller may control the orientation of the optical element without the output of the narrow FOV quadrant photodetector (1) while the output of the narrow FOV quadrant photodetector indicates no detection of a centroid of the second light, or (2) during a synchronization time period in which the detection circuit attempts to synchronize with the modulation of the optical beam. In some examples, the detection circuit may include a phased-lock loop. Moreover, in some embodiments, the system may also include a telescope that (1) receives the optical beam, where the optical beam includes (a) an optical data signal, and (b) a beacon signal for the optical data signal, and (2) forwards the optical beam to the optical element, and the controller may (1) direct the telescope toward an area of free space from which the optical beam is expected to emanate, (2) alter the orientation of the optical element to scan the area of free space from which the optical beam is expected to emanate, and (3) stabilize the stabilize the orientation of the optical element in response to the wide FOV quadrant photodetector receiving the optical beam, as indicated by the wide FOV quadrant photodetector receiving the first light originating from the optical beam, where the first light and the second light are derived from the beacon signal. In such examples, the system may further include (1) an optical filter that filters the beacon signal from the optical beam, and (2) a beam splitter that derives the first light and the second light from the beacon signal. Also, in some examples, the optical element may include a fine steering mirror (FSM).

In some embodiments, the controller may (1) detect the output of the narrow FOV quadrant photodetector indicating a centroid of the second light is located at an origin of the narrow FOV quadrant photodetector, (2) store the output of the wide FOV quadrant photodetector in response to the output of the narrow FOV quadrant photodetector indicating the centroid of the second light is located at the origin of the narrow FOV quadrant photodetector, and (3) adjust future outputs of the wide FOV quadrant photodetector using the stored output.

In one example, a method may include (1) receiving, by an optical element, an optical beam, (2) receiving, from the optical element by a wide FOV quadrant photodetector, first light originating from the optical beam, (3) receiving, from the optical element by a narrow FOV quadrant photodetector, second light originating from the optical beam, and (4) controlling, by a controller, an orientation of the optical element during at least a period of time based on a weighted combination of (a) output of the wide FOV quadrant photodetector in response to the first light, and (b) output of the narrow FOV quadrant photodetector in response to the second light. In some embodiments, controlling the orientation of the optical element based on the weighted combination occurs when (1) the output of the narrow FOV quadrant photodetector indicates a centroid of the second light is located outside a linear response range of the narrow FOV quadrant photodetector, and (2) a sign of the output of the narrow FOV quadrant photodetector and a sign of the output of the wide FOV quadrant photodetector are the same. In some examples, the method may include controlling the orientation of the optical element without the output of the wide FOV quadrant photodetector when the output of the narrow FOV quadrant photodetector indicates a centroid of the second light is located within a linear response range of the narrow FOV quadrant photodetector.

In one embodiment, a computer-readable medium may include computer-readable instructions that, when executed by at least one processor of a computing device, may cause the computing device to (1) receive an output from a wide FOV quadrant photodetector generated in response to receiving first light originating from an optical beam provided by an optical element, (2) receive an output from a narrow FOV quadrant photodetector generated in response to receiving second light originating from the optical beam, and (3) control an orientation of the optical element during at least a period of time based on a weighted combination of (a) the output received from the wide FOV quadrant photodetector, and (b) the output received from the narrow FOV quadrant photodetector.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 9 is table that lists exemplary pointing, acquisition, and tracking (PAT) modes that may be employed during operation of the systems of FIGS. 1 and 2.

Figure 1:
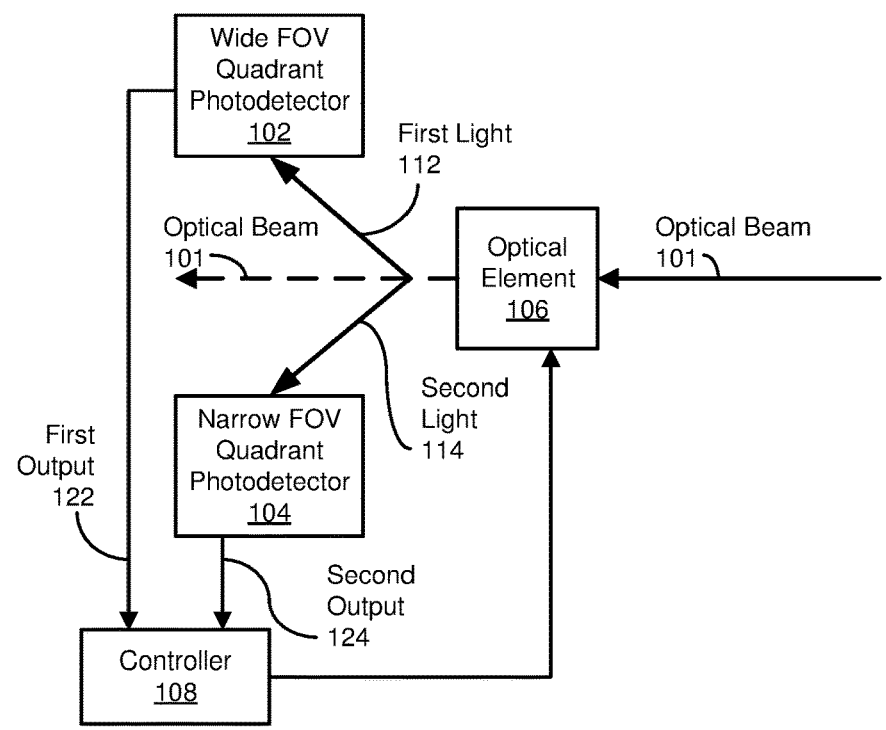
FIG. 1 is a block diagram of an exemplary system for weighted combination of quadrant photodetector output for beam tracking.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for weighted combination of quadrant photodetector output for beam tracking. In some examples, a system may control the orientation of an optical element that receives an optical beam based on a weighted combination of outputs from a wide FOV quadrant photodetector and a narrow FOV quadrant photodetector in response to light received at the photodetectors that originates from the optical beam. As will be explained in greater detail below, embodiments of the instant disclosure may facilitate faster, more accurate control of the orientation of the optical element to properly acquire and track the optical beam by blending the outputs to take advantage of the diverse characteristics of the quadrant photodetectors.

Figure 2:
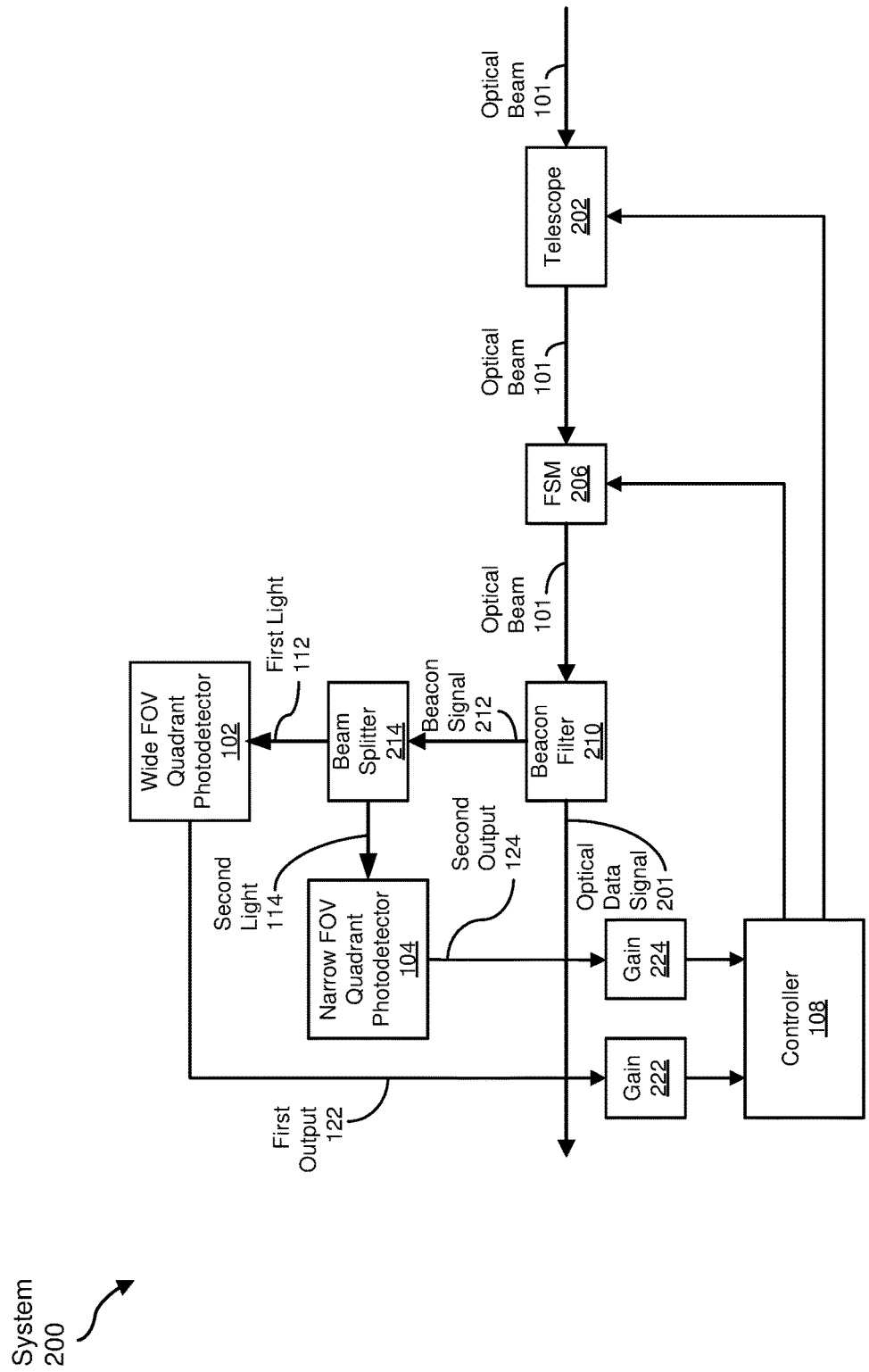
FIG. 2 is a block diagram of another exemplary system for weight combination of quadrant photodetector output for beam tracking.

The following will provide, with reference to FIGS. 1-11, detailed descriptions of systems and methods for weighted combinations of outputs from quadrant photodetectors for beam tracking. Exemplary systems for weighted combination of quadrant photodetector output are described in connection with FIGS. 1 and 2. A description of an exemplary quadrant photodetector that may be employed in the systems of FIGS. 1 and 2 is presented in conjunction with FIG. 3. With respect to FIGS. 4 and 5, exemplary response characteristics for both wide and narrow FOV quadrant photodetectors are discussed. Exemplary centroid zones associated with both aligned and misaligned quadrant photodetectors are described in reference to FIGS. 6 and 7. An exemplary method for weighted combination of quadrant photodetector output is described in connection with FIG. 8. Various exemplary modes of pointing, acquisition, and tracking (PAT) applicable to the systems of FIGS. 1 and 2 are discussed in conjunction with FIG. 9. An exemplary method of adjusting outputs of misaligned wide and narrow FOV quadrant photodetectors is presented in relation to FIG. 10. In connection with FIG. 11, a system of stored modules executable by a physical processor to implements the various systems and methods described herein is discussed.

FIG. 1 is a block diagram of an exemplary system 100 for weighted combination of quadrant photodetector output for beam tracking. System 100, in some embodiments, may include a wide FOV quadrant photodetector 102, a narrow FOV quadrant photodetector 104, an optical element 106, and/or a controller 108. As depicted in FIG. 1, optical element 106 may receive an optical beam 101, from which first light 112 and second light 114 may originate. Wide FOV quadrant photodetector 102 may generate a first output 122 based on a location at which first light 112 is detected on wide FOV quadrant photodetector 102. Similarly, narrow FOV quadrant photodetector 104 may generate a second output 124 based on a location at which second light 114 is detected on narrow FOV quadrant photodetector 104. Controller 108 may control an orientation (e.g., an angular orientation) of optical element 106 based on first output 122 and second output 124. In some examples, the orientation of optical element 106 may affect the location at which first light 112 and second light 114 are detected at wide FOV quadrant photodetector 102 and narrow FOV quadrant photodetector 104, respectively. Additionally, in some embodiments, as described more fully below, the orientation of optical element 106 may also determine where optical beam 101 is directed to other portions of system 100, or even whether optical beam 101 is received at optical element 106.

FIG. 2 is a block diagram of another exemplary system 200 for weight combination of quadrant photodetector output for beam tracking. In addition to wide FOV quadrant photodetector 102, narrow FOV quadrant photodetector 104, and controller 108, system 200 may include, in some examples, a telescope 202, a fine steering mirror (FSM) 206 (e.g., serving as optical element 106 of FIG. 1), a beacon filter 210, a beam splitter 214, and/or gain blocks 222 and 224. In some embodiments, system 200 may be incorporated within a free space optical communication system that receives and/or transmits communication over an optical communication link provided by optical beam 101. Further, in some examples, system 200 may be located at an orbiting space vehicle, ground station, or other location employing such a communication system. Accordingly, in some embodiments, optical beam 101 may include, or be closely aligned with, a beacon signal 212 that may aid in the acquisition and tracking of optical beam 101. Additionally, in some examples, optical beam 101 may include, or be closely aligned with, an optical data signal 201 that carries optical communication data received at system 200.

In some examples, telescope 202 may receive optical beam 101 and forward optical beam 101 to FSM 206 when telescope 202 is directed toward a source of optical beam 101 within some level of accuracy. In some embodiments, optical beam 101 may be a collimated optical beam on the order of several centimeters (cm) (e.g., 10-20 cm) in width. Thus, in environments in which the source of optical beam 101 is many miles distant from system 200, telescope 202 may need to be accurately pointed toward the source to properly receive optical beam 101. In some examples, controller 108 (or another controller) may control the orientation of telescope 202 about at least two axes (e.g., a horizontal (pitch) axis and a vertical (yaw) axis perpendicular to a longitudinal axis of telescope 202), such as by way of a gimbal or other rotatable mechanical structure and associated actuator (not depicted in FIG. 2) to point toward, and initially acquire, optical beam 101. Examples of telescope 202 may include, but are not limited to, a Gregorian telescope and a Cassegrain telescope. However, other types of telescopes, or other types of optical elements capable of receiving and forwarding optical beam 101 under the control of controller 108 may be employed in other embodiments.

Controller 108 may also control an angular (e.g., two-axis) orientation of FSM 206 to further acquire and track optical beam 101, as forwarded by telescope 202, for use in system 200. In some embodiments, FSM 206 may forward optical beam 101 to beacon filter 210, which may separate beacon signal 212 from optical data signal 201 (or vice-versa) so that beacon signal 212 is directed to beam splitter 214. Beam splitter 214, in some examples, may provide first light 112 to wide FOV quadrant photodetector 102 and second light 114 to narrow FOV quadrant photodetector 104. In some examples, as described above, first output 122 of wide FOV quadrant photodetector 102 is based on the location upon which first light 112 reaches wide FOV quadrant photodetector 102, while second output 124 of narrow FOV quadrant photodetector 104 is based on the location upon which second light 114 reaches narrow FOV quadrant photodetector 104. In some embodiments, these locations are based upon the current orientation of FSM 206, as controlled by controller 108. While FSM 206 may be employed as optical element 106 in system 200, other types of optical elements that are controllable by controller 108 may be utilized at optical element 106 in other embodiments. Additionally, in some examples, other optical components (e.g., lenses, mirrors, etc.) may supplement beacon filter 210 and beam splitter 214 to focus a collimated beacon signal 212 or perform other functions prior to directing first light 112 and/or second light 114 to wide FOV quadrant photodetector 102 and/or narrow FOV quadrant photodetector 104.

In some examples, gain block 222 may provide a configurable amount of gain to first output 122, and gain block 224 may provide a configurable amount of gain to second output 124, prior to processing by controller 108. Also, in some examples, controller 108 may include the functionality of gain blocks 222 and 224. In some embodiments, gain blocks 222 and 224 may alter the relative magnitude of first output 122 and second output 124. Further, in some examples, the gain levels applied by gain blocks 222 and 224 may be determined as part of a testing or characterizing phase of system 200, such as what may be performed during manufacturing of system 200. In other examples, gain blocks 222 and 224 may be configured during one or more operational phases of system 200.

In some embodiments, controller 108 may employ the orientation of telescope 202 as a relatively coarse angular control mechanism to receive optical beam 101, and may use the orientation of FSM 206 as a relatively fine angular control mechanism to acquire and track optical beam 101.

For example, controller 108 may use telescope 202 to initially point toward an area in which the source of optical beam 101 is expected, and then may employ FSM 206 to more accurately acquire and track optical beam 101 within some angular range. In some examples, tight tracking of optical beam 101 (e.g., within +/−5-10 microradians (wad)) may be desired in order to support high data-rate optical communications (e.g., 100 gigabit per second (Gb/s)).

Figure 3:
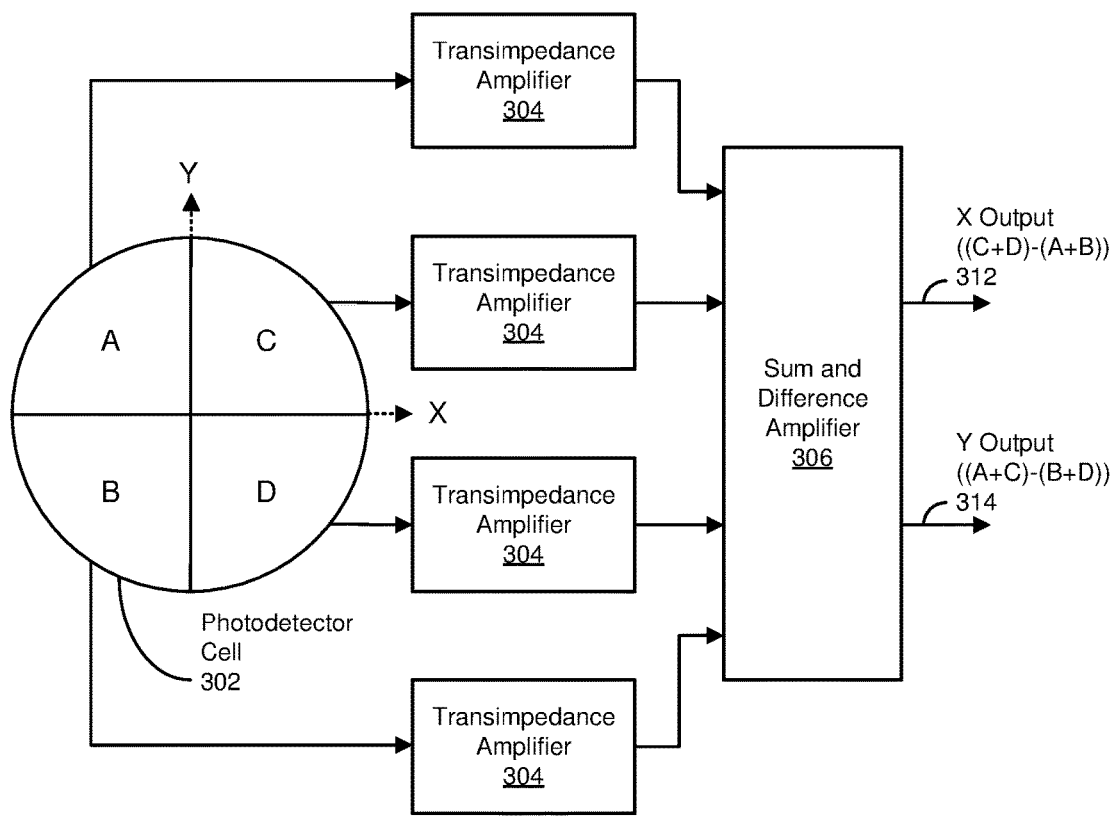
FIG. 3 is a block diagram of an exemplary quadrant photodetector employable in the systems of FIGS. 1 and 2.

FIG. 3 is a block diagram of an exemplary quadrant photodetector 300 employable in the systems of FIGS. 1 and 2. In some embodiments, quadrant photodetector 300 may serve as wide FOV quadrant photodetector 102 and/or narrow FOV quadrant photodetector 104. As illustrated in FIG. 3, quadrant photodetector 300 may include, in some examples, a plurality of photodetector cells 302, a plurality of transimpedance amplifiers 304, and a sum and different amplifier 306. However, components other than those depicted in FIG. 3 may be employed to perform the same or similar functions as those ascribed herein to quadrant photodetector 300.

In at least some embodiments, quadrant photodetector 300 may include four individual photodetector cells 302 (e.g., photodiodes or other photosensitive devices) that may be shaped and/or arranged into four separate, but equally sized and shaped, quadrants (A, B, C, and D in FIG. 3) that form a singular area (e.g., a circle). Based on an amount of light (e.g., first light 112 or second light 114) received at each photodetector cell 302, photodetector cell 302 may generate a corresponding amount of electrical current, which may then be provided to a corresponding transimpedance amplifier 304 to convert the received electrical current into a corresponding analog voltage. In some embodiments, each transimpedance amplifier 304 may then provide its generated voltage to sum and different amplifier 306 that may generate one or more analog voltages as output (e.g., first output 122 or second output 124). In the example of FIG. 3, the output of sum and different amplifier 306 includes X output 312 and Y output 314 that may indicate coordinates of the location of a centroid of first light 112 or second light 114 from a center (e.g., origin) of the area defined by photodetector cells 302, as indicated in FIG. 3. In some embodiments, X output 312 may represent the value (C+D)−(A+B) and Y output 314 may represent the value (A+C)−(B+D), where each of A, B, C, and D represent the amount of light received at each corresponding photodetector cell 302. Further, in some embodiments, X output 312 and Y output 314 may be normalized, such as by dividing each resulting value by a sum of the amount of light received at photodetector cells 302 (e.g., A+B+C+D). Accordingly, in such embodiments, X output 312 may represent the value ((C+D)−(A+B))/(A+B+C+D) and Y output 314 may represent the value ((A+C)−(B+D))/(A+B+C+D).

As employed herein, the term "centroid" may generally refer to a geometric center of a shape (e.g., a circle or ellipse) described by light (e.g., first light 112 or second light 114) impacting the light-sensitive surface of quadrant photodetector 300 defined by photodetector cells 302. While the discussion above refers to an intended or ideal response (e.g., X output 312 and Y output 314) of quadrant photodetector 300, the actual response of various types of quadrant photodetectors 300 may deviate somewhat from the ideal based on one or more characteristics, such as the FOV provided by a particular quadrant photodetector 300.

Figure 4:
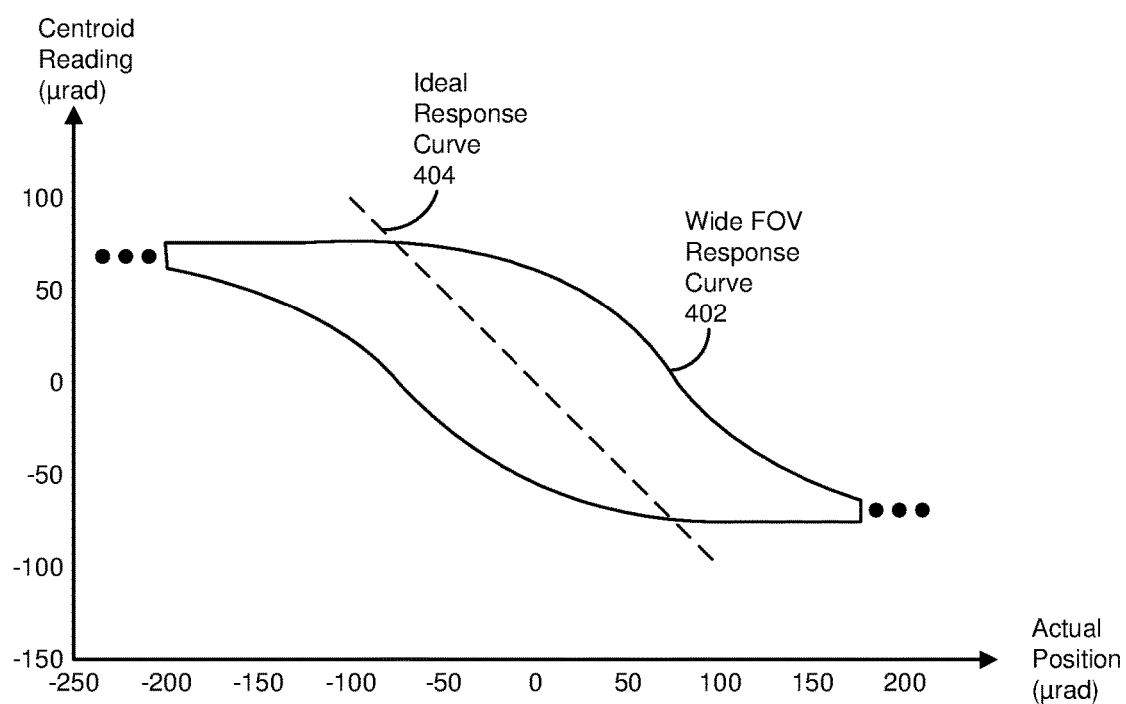
FIG. 4 is a graph of an exemplary response of a wide FOV quadrant photodetector.
Figure 5:
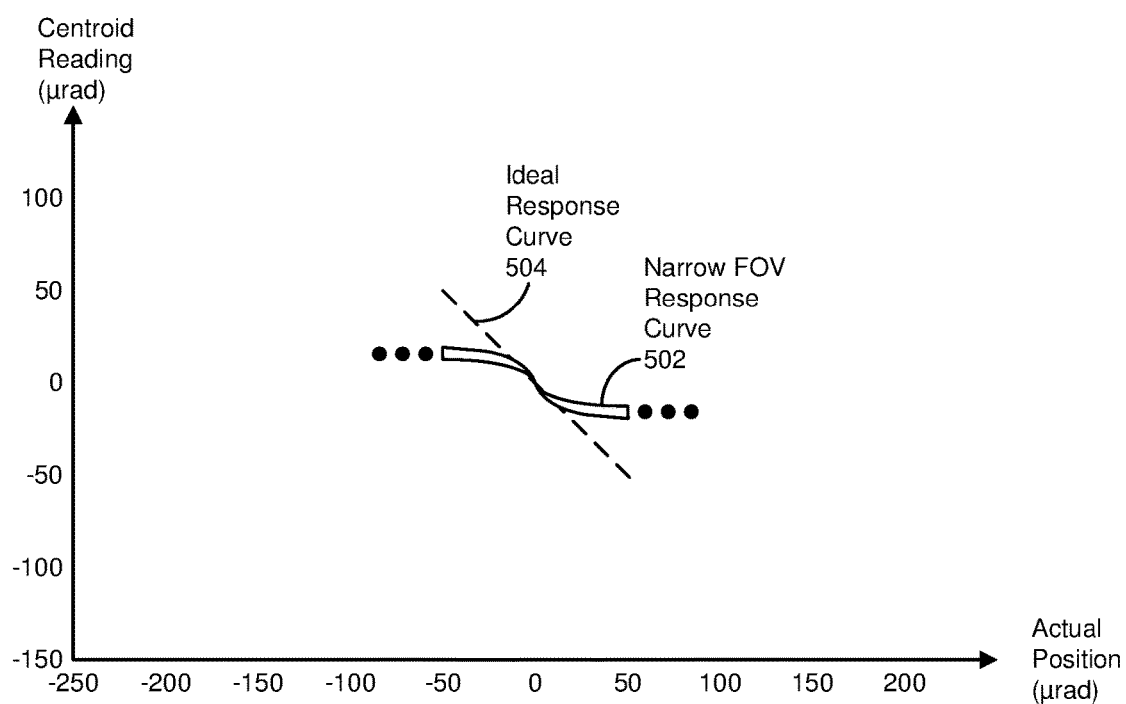
FIG. 5 is a graph of an exemplary response of a narrow FOV quadrant photodetector.

For example, FIGS. 4 and 5 present graphs of exemplary responses for wide FOV quadrant photodetector 102 and narrow FOV quadrant photodetector 104, respectively, that depart from the ideal response. More specifically, FIG. 4 is a graph of an exemplary response 400 of wide FOV quadrant photodetector 102, and FIG. 5 is a graph of an exemplary response 500 of narrow FOV quadrant photodetector 104. As can be seen in FIG. 4, response 400 is depicted by way of a wide FOV response curve 402 generated during testing, and plotted against an ideal response curve 404. Similarly, in FIG. 5, response 500 is depicted by way of a narrow FOV response curve 502 depicted relative to an ideal response curve 504. More specifically, in both FIGS. 4 and 5, the resulting centroid reading (in μrad) from the origin of quadrant photodetector 102 or 104, based on the generated X output 312 and Y output 314, is plotted relative to the actual centroid position (also in μrad). In both cases, less than the entire response curve 402 or 502 across the entire FOV of the associated quadrant photodetector 102 or 104 is shown to focus attention on the more central portions of response curves 402 and 502.

As shown in FIGS. 4 and 5, in some examples, wide FOV quadrant photodetector 102 may exhibit a relatively wide response (e.g., over +/−100 μrad) substantially centered about the origin before saturation becomes significant relative to the relatively narrow response (e.g., over +/−10 μrad) of narrow FOV quadrant photodetector 104, where increased centroid distances away from the origin do not produce a corresponding increase in centroid location reading. Additionally, in some embodiments, as shown in FIG. 4, wide FOV response curve 402 may span a large area about the origin, indicating that wide FOV quadrant photodetector 102 may provide an incorrect polarity (e.g., positive instead of negative, and/or vice-versa) centroid reading relative to the actual centroid position in a central region of wide FOV quadrant photodetector 102. Such a response 400 may be problematic in environments (e.g., typical atmospheric conditions) in which scintillation noise may be present in optical beam 101. Oppositely, as illustrated in FIG. 5, while narrow FOV quadrant photodetector 104 provides a much smaller range before saturation relative to wide FOV quadrant photodetector 102, narrow FOV quadrant photodetector 104 may also provide little variation between narrow FOV response curve 502 and ideal response curve 504 along a substantially linear region of narrow FOV response curve 502 (e.g., spanning approximately +/−15-20 μrad about the origin).

Based on these differences in response characteristics between wide FOV quadrant photodetector 102 and narrow FOV quadrant photodetector 104, systems 100 and 200 may determine when first output 122 of wide FOV quadrant photodetector 102, second output 124 of narrow FOV quadrant photodetector 104, or some combination thereof, may be used to control the orientation of FSM 206 based on a current detected location of the centroids of first light 112 and/or second light 114 on quadrant photodetectors 102 and 104.

Figure 6:
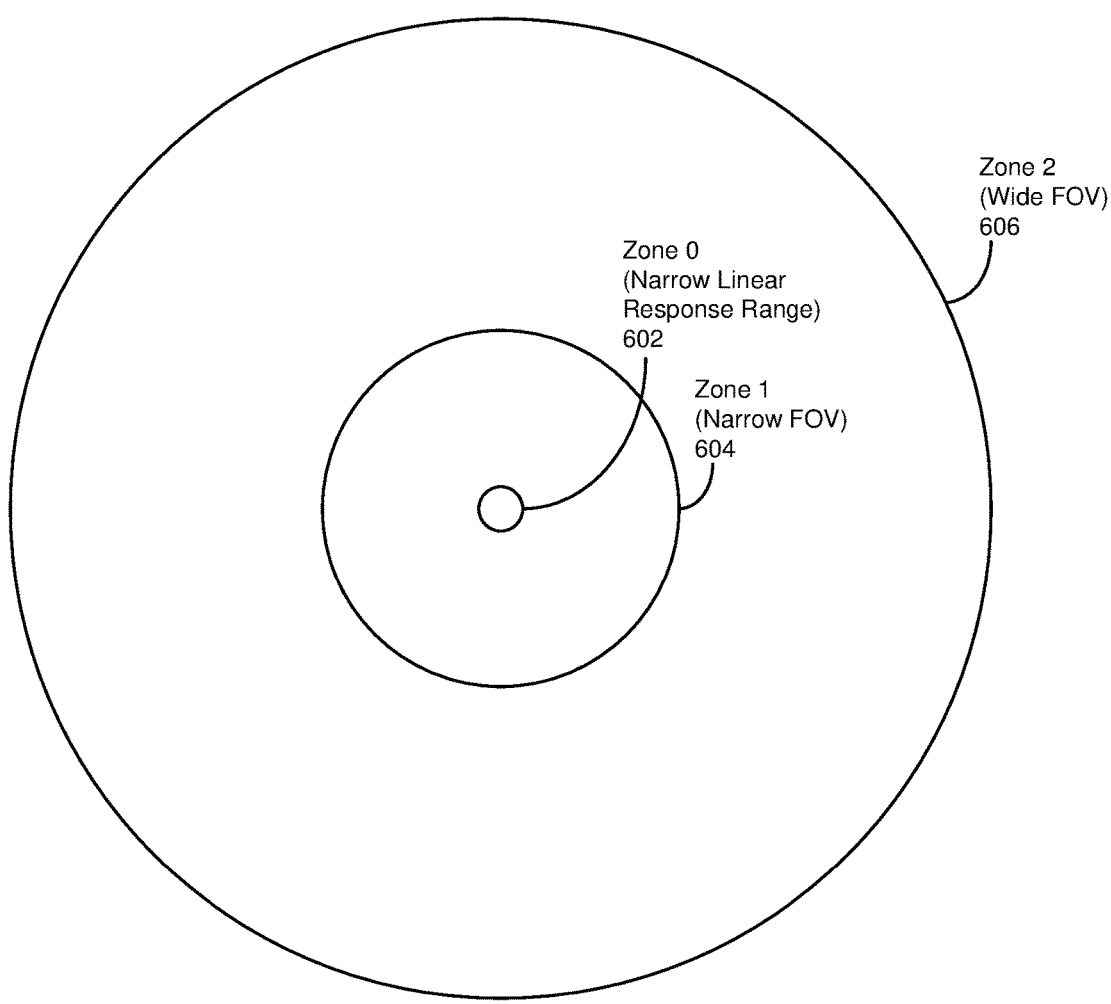
FIG. 6 is a graphical representation of a plurality of exemplary centroid zones that may be associated with a wide FOV quadrant photodetector and a narrow FOV quadrant photodetector employable in the systems of FIGS. 1 and 2, when aligned.

To that end, FIG. 6 is a graphical representation of a plurality of exemplary centroid zones 600 that may be associated with wide FOV quadrant photodetector 102 and narrow FOV quadrant photodetector 104, when aligned (e.g., such as when the centroid of first light 112 is located at the origin of wide FOV quadrant photodetector 102 at the same time the centroid of second light 114 is located at the origin of narrow FOV quadrant photodetector 104). In some embodiments, the use of first output 122 and/or second output 124 may depend on which of the centroid zones 600 in which the centroid of first light 112 and/or second light 114 are located. For example, in situations in which the centroid is discovered in Zone 2 606 (e.g., within the FOV of wide FOV quadrant photodetector 102 but not within the FOV of narrow FOV quadrant photodetector 104, as represented in first output 122 but not second output 124), controller 108 may employ first output 112, but not second output 124, in controlling optical element 106 (e.g., FSM 206). If, instead, the centroid is discovered in Zone 1 604 (e.g., within the FOV of both wide FOV quadrant photodetector 102 and narrow FOV quadrant photodetector 104, but not within the linear response range of narrow FOV quadrant photodetector 104), controller 108 may employ both first output 122 and second output 124 (e.g., by using a weighted combination thereof) to control the orientation of optical element 106. If the centroid is discovered in Zone 0 602 (e.g., within the FOV of both wide FOV quadrant photodetector 102 and narrow FOV quadrant photodetector 104, as well as within the linear response range of narrow FOV quadrant photodetector 104), controller 108 may employ second output 124, but not first output 122, in controlling the orientation of optical element 106.

Figure 7:
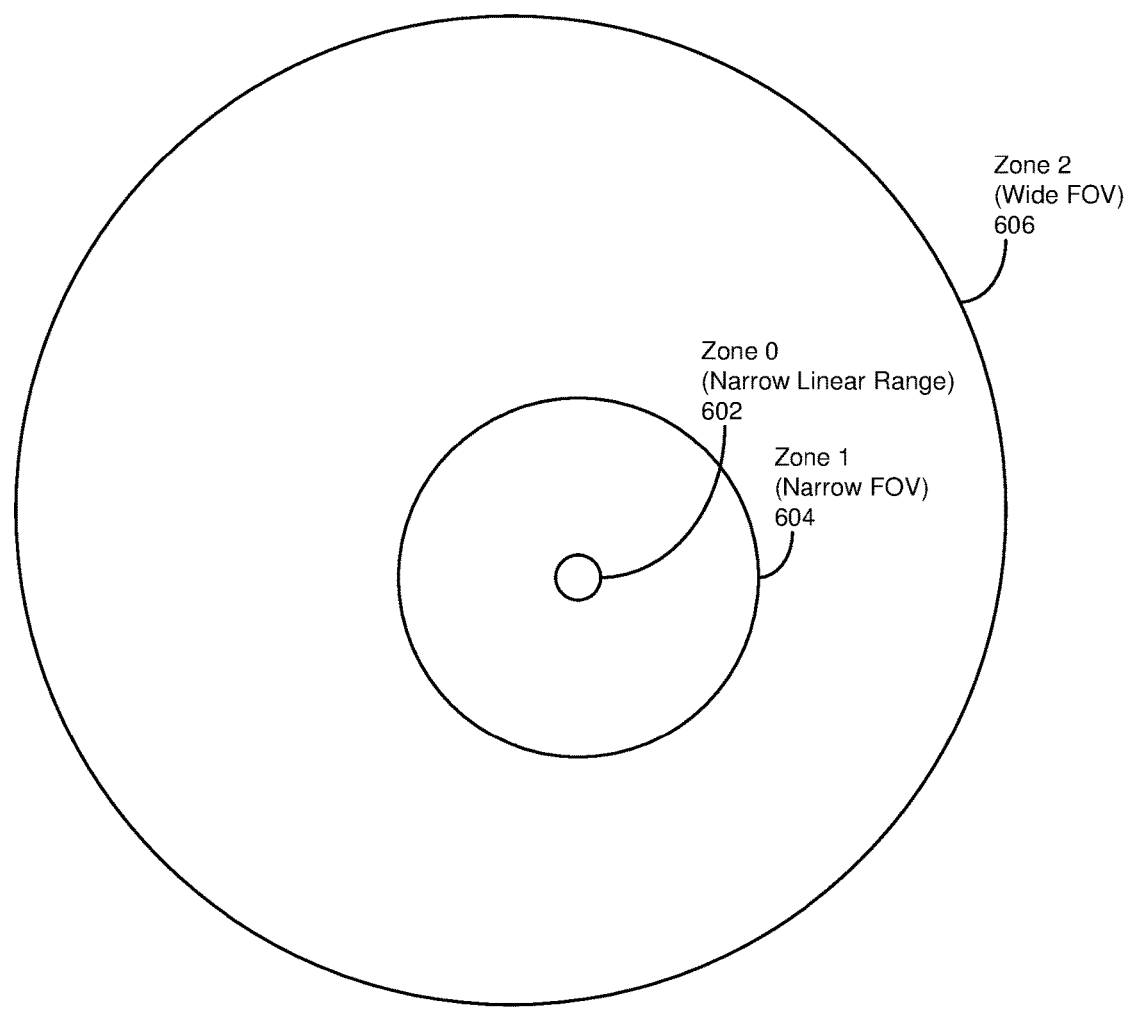
FIG. 7 is a graphical representation of a plurality of exemplary centroid zones that may be associated with a wide FOV quadrant photodetector and a narrow FOV quadrant photodetector employable in the systems of FIGS. 1 and 2, when misaligned.

In some examples, unlike the situation shown in FIG. 6, quadrant photodetectors 102 and 104 may be misaligned relative to each other (e.g., such as when the centroid of first light 112 is not located at the origin of wide FOV quadrant photodetector 102 when the centroid of second light 114 is located at the origin of narrow FOV quadrant photodetector 104). Such misalignment may occur as a result of typical manufacturing tolerances in the physical position of quadrant photodetectors 102 and 104, beam splitter 214, and so on in system 200. FIG. 7 is a graphical representation of such a situation, where a plurality of exemplary centroid zones 700 that may be associated with quadrant photodetectors 102 and 104 are misaligned. Moreover, in this example, such misalignment may result in Zone 2 606 (corresponding to wide FOV quadrant photodetector 102) having a different effective origin from that associated with Zone 0 602 and Zone 1 604 (corresponding to narrow FOV quadrant photodetector 104). In such examples, controller 108 may adjust first output 122 and/or second output 124 to account for the misalignment. An exemplary method of adjusting for such an alignment is presented below in conjunction with FIG. 10.

Figure 8:
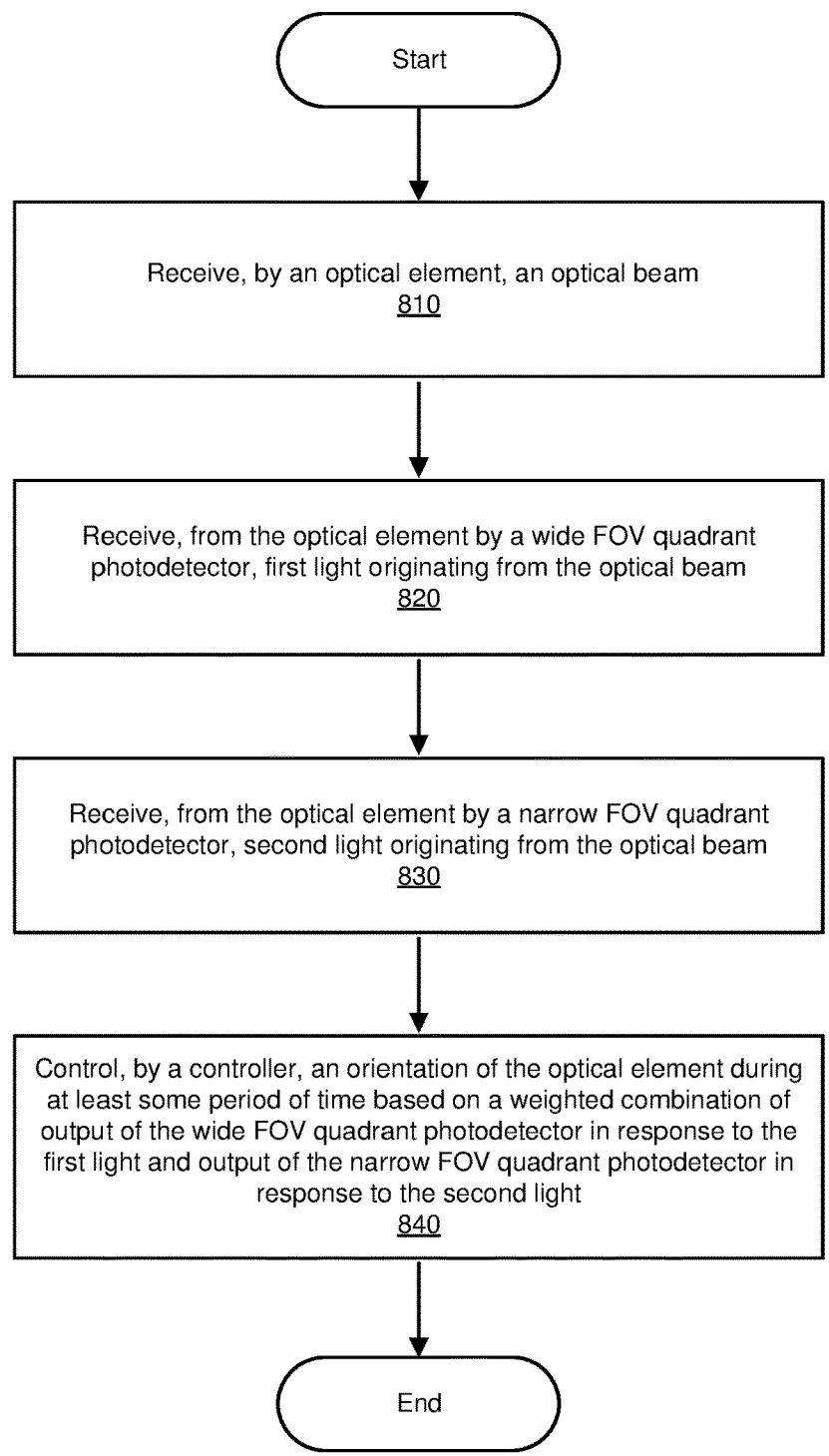
FIG. 8 is a flow diagram of an exemplary method for weighted combination of quadrant photodetector output for beam tracking.

FIG. 8 is a flow diagram of an exemplary method 800 for weighted combination of quadrant photodetector output for beam tracking. At step 810, an optical element (e.g., optical element 106, such as FSM 206) may receive an optical beam (e.g., optical beam 101). At step 820, a wide FOV quadrant photodetector (e.g., wide FOV quadrant photodetector 102) may receive, from the optical element, first light (e.g., first light 112) originating from the optical beam. At step 830, a narrow FOV quadrant photodetector (e.g., narrow FOV quadrant photodetector 104) may receive, from the optical element, second light (e.g., second light 114) originating from the optical beam. In some examples, other optical elements (e.g., beacon filter 210 and/or beam splitter 214) may direct light from the optical beam as the first light and/or the second light to the quadrant photodetectors. At step 840, a controller (e.g., controller 108) may control an orientation of the optical element during at least some period of time based on a weighted combination of output (e.g., first output 122) of the wide FOV quadrant photodetector in response to the first light and output (e.g., second output 124) of the narrow FOV quadrant photodetector in response to the second light. In some examples, the controller may employ the weighted combination of the outputs during a time period in which a centroid of the first light and/or second light is within the FOV of both quadrant photodetectors, and possibly while outside a linear response range of the narrow FOV quadrant photodetector, as discussed above.

One or more of the steps shown in FIG. 8, as well as one or more steps of other methods discussed herein, may be performed at least in part by any suitable computer-executable code and/or computing system, including systems 100 and 200 of FIGS. 1 and 2. In some examples, one or more of the steps shown in these methods may represent an algorithm whose structure may include and/or is represented by multiple sub-steps, examples of which are provided in greater detail herein.

FIG. 9 is table 900 that lists exemplary pointing, acquisition, and tracking (PAT) modes 902-908 that may be employed during operation of systems 100 and 200 of FIGS. 1 and 2. As illustrated in FIG. 9, PAT modes 902-908 may include scan mode 902, seek mode 904, settle mode 906, and/or tracking mode 908. While PAT modes 902-908 are described below in conjunction with systems 100 and 200, other systems not explicitly described herein may also implement PAT modes 902-908, or some subset thereof, in other embodiments. In some examples, each of the PAT modes 902-908 may be implemented as a separate state of a state machine (e.g., in the operation of controller 108).

Initially, in some embodiments, controller 108 may operate in scan mode 902, in which neither wide FOV quadrant photodetector 102 nor narrow FOV quadrant photodetector 104 initially detect beacon signal 212 (e.g., via first light 112 or second light 114). During scan mode 902, controller 108 may employ a scanning operation (e.g., a conical scan) using FSM 206 in an area of free space from which optical beam 101 is expected to emanate, as captured by telescope 202. In some examples, controller 108 may receive one or more inputs (e.g., a current position of a vehicle in which system 100 or 200 is installed, a current attitude of the vehicle, a location (e.g., a Global Position Sensing (GPS) indication) of the source of optical beam 101, and so on, that controller 108 may process to orient telescope 202 toward the area of interest so that controller 108 may employ FSM 206 to perform the scanning operation.

In some examples, beacon signal 212 may be uniquely modulated to distinguish beacon signal 212 from other light sources that may be detected by system 100 or 200. Consequently, controller 108, in some examples, may include a detection circuit (e.g., a phase-locked loop (PLL)) that may detect and confirm that the received light is the intended beacon signal 212 and/or facilitates reception of data (e.g., as presented in optical data signal 201). Thus, during scan mode 902, in some embodiments, controller 108, after receiving first output 122 and/or second output 124 from quadrant photodetectors 102 and/or 104 indicating the presence of optical beam 101, may attempt to synchronize with beacon signal 212 using the detection circuit. In such examples, when controller 108 successfully synchronizes with beacon signal 212 (e.g., for at least some time period), thus possibly verifying discovery of beacon signal 212, controller 108 may proceed to seek mode 904.

Upon entering seek mode 904, in some embodiments, controller 108 may "freeze" or stabilize scanning via FSM 206. In some examples, this freezing may restrict movement of FSM 206 so that the orientation of FSM 206 varies only within a certain angle of the orientation of FSM 206 when seek mode 904 was entered. In some examples, during seek mode 904, controller 108 may employ first output 122 from wide FOV quadrant photodetector 102 and/or second output 124 of narrow FOV quadrant photodetector 104, as described above, in controlling the orientation of FSM 206 while maintaining synchronization with beacon signal 212. For example, controller 108 may employ first output 122 from wide FOV quadrant photodetector 102 (e.g., based on the location of the centroid of first light 112), and not second output 124 of narrow FOV quadrant photodetector 104, in controlling the orientation of FSM 206 while maintaining synchronization with beacon signal 212, and while second output 124 from narrow FOV quadrant photodetector 104 indicates that narrow FOV quadrant photodetector 104 does not detect beacon signal 212 (e.g., while beacon signal 212 is located in Zone 2). Moreover, in some examples, controller 108 may also use a weighted combination of first output 122 from wide FOV quadrant photodetector 102 and second output 124 of narrow FOV quadrant photodetector 104, as described above, in controlling the orientation of FSM 206 while maintaining synchronization with beacon signal 212 (e.g., while beacon signal 212 is located in Zone 1). In some examples, the weighted combination may be a constant ratio (e.g., 1:1) of first output 122 to second output 124. In other embodiments, the weighted combination may be a normalized ratio that varies initially from 100 percent of first output 122 and 0 percent of second output 124 to a final value of 0 percent of first output 122 and 100 percent of second output 124. In some embodiments, the varying of the ratio may occur linearly over time (e.g., over a predetermined length of time, such as 0.075 to 0.1 seconds), but other variation profiles are possible as well. In some embodiments, controller 108 may employ second output 124 to synchronize with the modulation of beacon signal 212 (e.g., for at least some period of time) in determining whether beacon signal 212 is detected using narrow FOV quadrant photodetector 104. Also, in some examples, if controller 108 loses synchronization with beacon signal 212 (e.g., using first output 122 and/or second output 124 by way of a loss of lock with the PLL), controller 108 may revert to scan mode 902.

During seek mode 904, controller 108 may determine that the centroid of second light 114 (e.g., as represented in second output 124) is located within the linear response range (e.g., about the origin) of narrow FOV quadrant photodetector 104 (e.g., Zone 0). Based on that determination, controller 108 may enter settle mode 906. In some examples, while in settle mode 906, controller 108 may employ second output 124 of narrow FOV quadrant photodetector 104, and not first output 122 of wide FOV quadrant photodetector 102, to control the orientation of FSM 206. In some examples, controller 108 may remain in settle mode 906 from some predetermined settling time period as long as the centroid of second light 114 remains within the linear response range of narrow FOV quadrant photodetector 104, as indicated in second output 124. If, instead, controller 108 determines that the centroid of second light 114 falls outside the linear response range, controller 108 may revert to seek mode 904. Further, in some examples, a loss of synchronization with beacon signal 212 (e.g., using first output 122 and/or second output 124) may cause controller 108 to revert to scan mode 902 or seek mode 904.

Presuming instead that controller 108 controls the orientation of FSM 206 within the settling time period, controller 108 proceed to tracking mode 908. In some examples, upon entering tracking mode 908, controller 108 may decrease (e.g., "ramp down") the scan freezing or stabilization that was initiated at the beginning wide FOV seek mode 904 (e.g., thus possibly allowing more rotational movement of FSM 206 while leaving telescope 202 at its current angular orientation) while continuing to use second output 124 (e.g., without the use of first output 122) to control the orientation of FSM 206. In some embodiments, if controller 108 is not able to maintain the centroid of second light 114 within the linear response range of narrow FOV quadrant photodetector 104, controller 108 may revert to seek mode 904. Further, in some examples, if controller 108 loses synchronization with beacon signal 212 via first output 122 and/or second output 124, controller 108 may revert to seek mode 904 or scan mode 902, as described above.

In some examples, as indicated in FIG. 9, controller 108 may employ the use of an integrator (e.g., in hardware or software) during control of the orientation of FSM 206 that may serve to eliminate long-term positioning errors and/or provide more orientation stability. In some embodiments, controller 108 may deactivate use of the integrator (not shown in FIGS. 1 and 2) during scan mode 902 and/or seek mode 904, and activate the integrator during settle mode 906 and/or tracking mode 908.

In view of the various PAT modes 902-908, as well as in other embodiments, controller 108 may operate as part of a control loop in which controller 108 controls orientation of FSM 206 using first output 122 and/or second output 124 for loop feedback, as described above. In some embodiments, controller 108 may sample first output 122 and/or second output 124 at some predetermined sample rate (e.g., 15 kilohertz (kHz) or more) to adapt the orientation of FSM 206 in the presence of various perturbations, such as mechanical vibrations that may be experienced by an orbiting vehicle upon which system 100 or 200 is installed.

Figure 10:
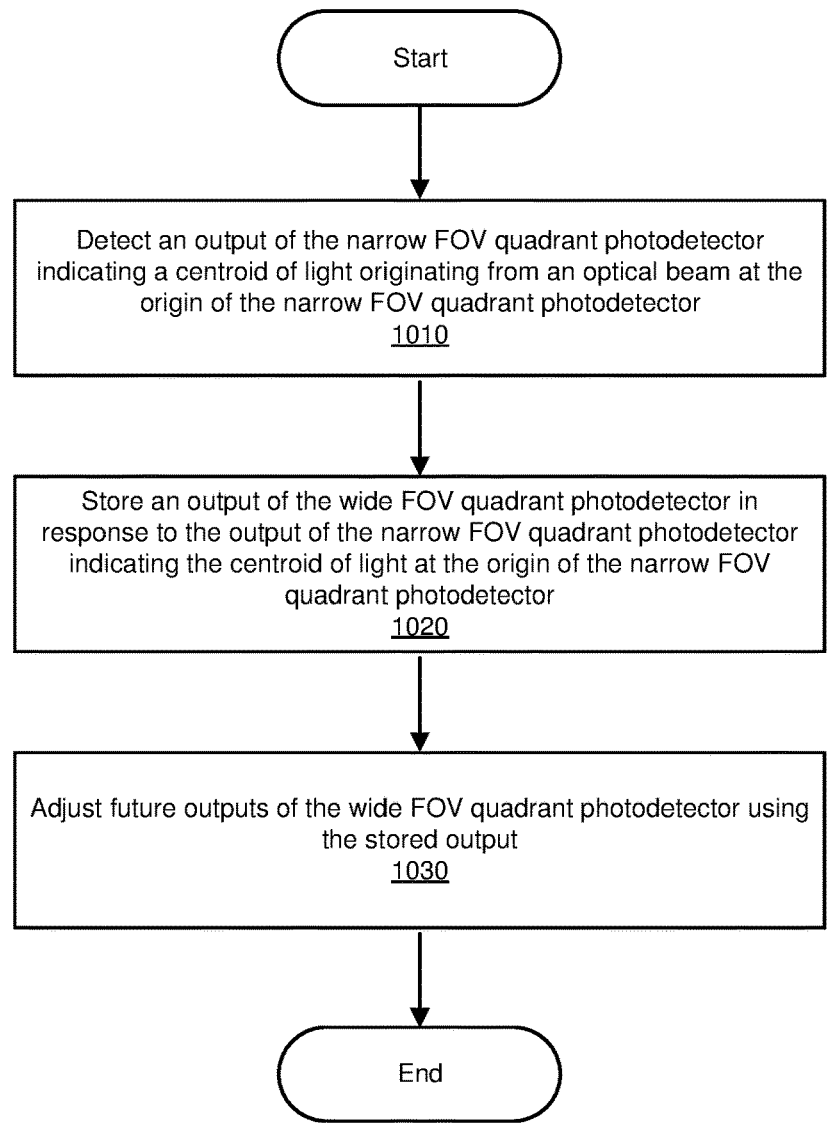
FIG. 10 is a flow diagram of an exemplary method of adjusting an output of a wide FOV quadrant photodetector when the wide FOV quadrant photodetector and a narrow FOV quadrant photodetector are misaligned, as depicted in FIG. 7.

FIG. 10 is a flow diagram of an exemplary method 1000 of adjusting first output 122 of wide FOV quadrant photodetector 102 when wide FOV quadrant photodetector 102 and narrow FOV quadrant photodetector 104 are misaligned, as depicted in FIG. 7. At step 1010, controller 108 may detect an output of narrow FOV quadrant photodetector 104 that indicates the centroid of second light 114 is located at the origin of narrow FOV quadrant photodetector 104. At step 1020, controller 108 may store second output 124 of wide FOV quadrant photodetector 102 in response to the detection of the centroid of second light at the origin of narrow FOV quadrant photodetector 104. At step 1030, controller 108 may adjust future values of first output 122 of wide FOV quadrant photodetector 102 based on the stored second output 124. In some examples, controller 108 may adjust first output 122 by subtracting the stored X output 312 and Y output 314 of second output 124 from the corresponding X output 312 and Y output 314 of current first output 122 to yield the adjusted first output 122. Other methods of adjusting first output 122 and/or second output 124 to counteract a relative misalignment of quadrant photodetectors 102 and 104 are also possible in other embodiments.

Figure 11:
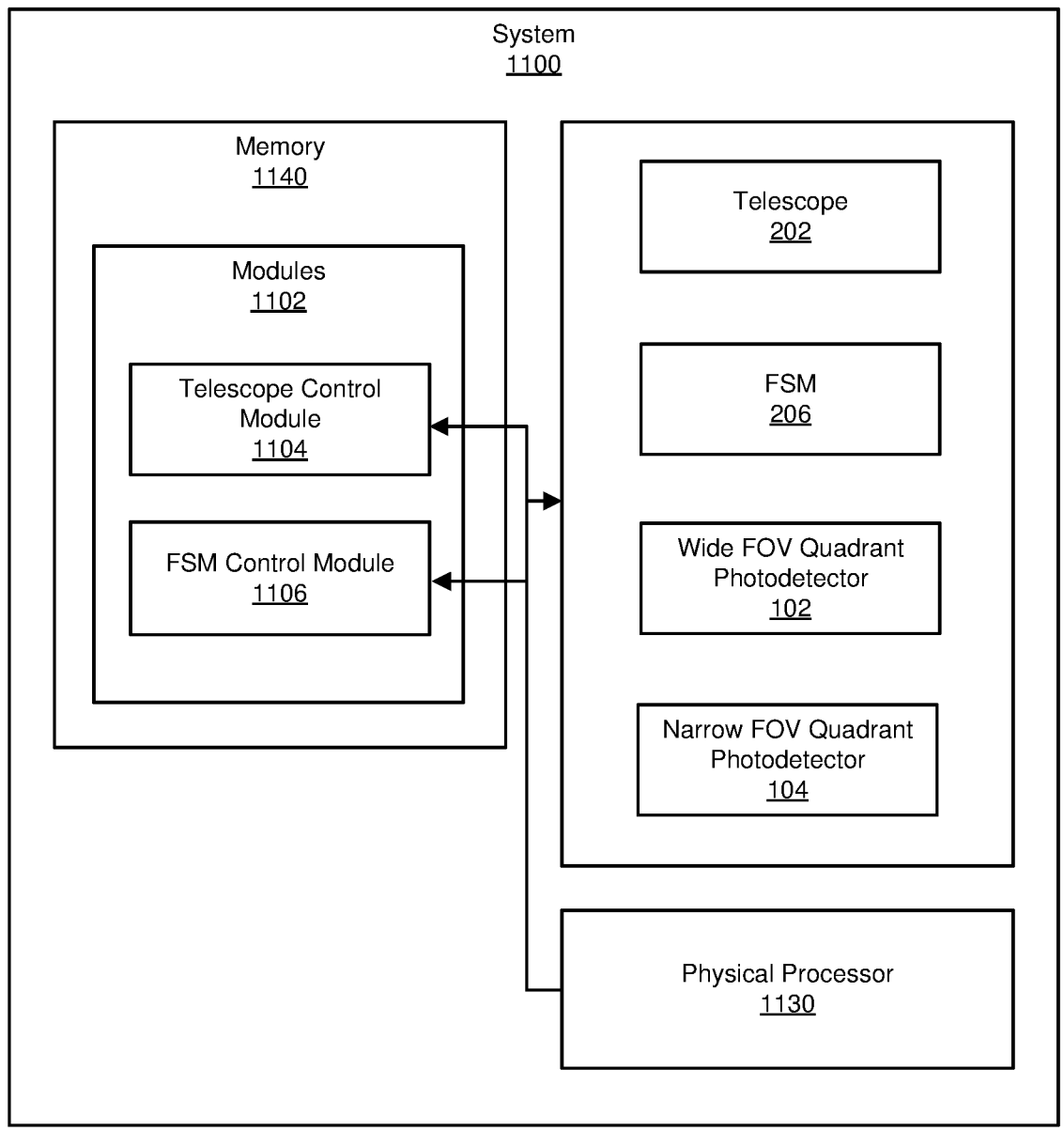
FIG. 11 is a block diagram of an exemplary system including modules, executable by a physical processor, that may implement the systems and methods described herein.

FIG. 11 is a block diagram of an exemplary system 1100 including memory 1140 storing modules 1102, executable by a physical processor 1130, that may implement the systems (e.g., systems 100 and 200) and methods (e.g., methods 800 and 1000) described herein. Modules 1102 may include a telescope control module 1104 and/or an FSM control module 1106, either or both of which may operate as controller 108, discussed above. Moreover, in some examples, modules 1102 may communication with additional elements of system 1100, such as telescope 202, FSM 206, wide FOV quadrant photodetector 102, and narrow FOV quadrant photodetector 104, as described above. Further, in some embodiments, system 1100 may serve as part of a larger optical communication system, as discussed earlier, which, in turn, may be located on an orbiting vehicle or platform, ground station, or other system or device that may engage in free space optical communication (e.g., via optical beam 101).

Telescope control module 1104, in some embodiments, may control the orientation of telescope 202 based on one or more inputs, such as the location and/or orientation of system 1100, an expected location of a source of optical beam 101, and so on, as discussed earlier. FSM control module 1106, in some examples, may control the orientation of FSM 206 based on first output 122 and second output 124 of wide FOV quadrant photodetector 102 and narrow FOV quadrant photodetector 104, respectively, as described in detail above (e.g., according to method 800 of FIG. 8 and/or PAT modes 902-908 of FIG. 9), as well as adjusting for potential misalignment of quadrant photodetectors 102 and 104 (e.g., according to method 1000 of FIG. 10).

As explained above in conjunction with FIGS. 1 through 11, the systems and methods described herein may facilitate quick and accurate control of an optical element responsible for tracking an optical beam, such as an optical beam serving as a free space optical communication link. In some examples, the use of a weighted combination of outputs from a wide FOV quadrant photodetector and a narrow FOV quadrant photodetector may help emphasize the particular favorable characteristics (e.g., FOV, non-saturated response range, linear response range, and so on) associated with each photodetector to provide overall improved acquisition and tracking of the optical beam. In so doing, an overall enhanced signal-to-scintillation-noise ratio for the system may be produced, possibly resulting in tighter tracking of the optical beam, and thus potentially supporting higher communication data rates as a result.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive light centroid location data (e.g., from quadrant photodetectors 102 and 104) to be transformed, transform the light centroid location data, and output a result of the transformation to orient an optical element (e.g., optical element 106). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
    an optical element that receives an optical beam;
    a wide field-of-view (FOV) quadrant photodetector that receives, from the optical element, first light originating from the optical beam;

a narrow FOV quadrant photodetector that receives, from the optical element, second light originating from the optical beam; and a controller that controls an orientation of the optical element in a manner that tracks the optical beam during at least a period of time based on a weighted combination of:

output of the wide FOV quadrant photodetector in response to the first light; and output of the narrow FOV quadrant photodetector in response to the second light.

2. The system of claim 1, wherein:
the weighted combination comprises a constant ratio of the output of the wide FOV quadrant photodetector to the output of the narrow FOV quadrant photodetector over the period of time.

3. The system of claim 1, wherein:
the weighted combination comprises a normalized combination ranging, over the period of time,
from 100 percent of the output of the wide FOV quadrant photodetector and 0 percent of the output of the narrow FOV quadrant photodetector,
to 0 percent of the output of the wide FOV quadrant photodetector and 100 percent of the output of the narrow FOV quadrant photodetector.

4. The system of claim 3, wherein the weighted combination changes linearly over the period of time.

5. The system of claim 1, wherein:
the controller controls the orientation of the optical element based on the weighted combination when the output of the narrow FOV quadrant photodetector indicates a centroid of the second light is located outside a linear response range of the narrow FOV quadrant photodetector.

6. The system of claim 1, wherein:
the controller controls the orientation of the optical element based on the weighted combination when:
the output of the narrow FOV quadrant photodetector indicates a centroid of the second light is located outside a linear response range of the narrow FOV quadrant photodetector; and
a sign of the output of the narrow FOV quadrant photodetector and a sign of the output of the wide FOV quadrant photodetector are the same.

7. The system of claim 1, wherein:
the controller controls the orientation of the optical element without the output of the wide FOV quadrant photodetector when the output of the narrow FOV quadrant photodetector indicates a centroid of the second light is located within a linear response range of the narrow FOV quadrant photodetector.

8. The system of claim 7, wherein:
the linear response range of the wide FOV quadrant photodetector is less than 20 micro radians.

9. The system of claim 1, wherein:
the controller controls the orientation of the optical element without the output of the wide FOV quadrant photodetector when:
the output of the narrow FOV quadrant photodetector indicates detection of a centroid of the second light; and
a sign of the output of the narrow FOV quadrant photodetector and a sign of the output of the wide FOV quadrant photodetector are different.

10. The system of claim 1, wherein:
the controller controls the orientation of the optical element without the output of the narrow FOV quadrant photodetector when the output of the narrow FOV quadrant photodetector indicates no detection of a centroid of the second light.

11. The system of claim 1, wherein:
the system further comprises a detection circuit that detects a modulation of the optical beam; and
the controller controls the orientation of the optical element without the output of the narrow FOV quadrant photodetector:
while the output of the narrow FOV quadrant photodetector indicates no detection of a centroid of the second light; or
during a synchronization time period in which the detection circuit attempts to synchronize with the modulation of the optical beam.

12. The system of claim 11, wherein:
the detection circuit comprises a phased-lock loop.

13. The system of claim 11, wherein:
the system further comprises a telescope that:
receives the optical beam, wherein the optical beam comprises:
an optical data signal; and
a beacon signal for the optical data signal; and
forwards the optical beam to the optical element; and
the controller:
directs the telescope toward an area of interest in free space;
alters the orientation of the optical element to scan the area of interest in free space; and
stabilizes the orientation of the optical element in response to the wide FOV quadrant photodetector receiving the optical beam, as indicated by the wide FOV quadrant photodetector receiving the first light originating from the optical beam, wherein the first light and the second light are derived from the beacon signal.

14. The system of claim 13, further comprising:
an optical filter that filters the beacon signal from the optical beam; and
a beam splitter that derives the first light and the second light from the beacon signal.

15. The system of claim 1, wherein:
the optical element comprises a fine steering mirror (FSM).

16. The system of claim 1, wherein the controller:
detects the output of the narrow FOV quadrant photodetector indicating a centroid of the second light is located at an origin of the narrow FOV quadrant photodetector;
stores the output of the wide FOV quadrant photodetector in response to the output of the narrow FOV quadrant photodetector indicating the centroid of the second light is located at the origin of the narrow FOV quadrant photodetector; and
adjusts future outputs of the wide FOV quadrant photodetector using the stored output.

17. A method comprising:
receiving, by an optical element, an optical beam;
receiving, from the optical element by a wide FOV quadrant photodetector, first light originating from the optical beam;
receiving, from the optical element by a narrow FOV quadrant photodetector, second light originating from the optical beam; and controlling, by a controller, an orientation of the optical element in a manner that tracks the optical beam during at least a period of time based on a weighted combination of:
  output of the wide FOV quadrant photodetector in response to the first light; and
  output of the narrow FOV quadrant photodetector in response to the second light.

18. The method of claim 17, wherein:
controlling the orientation of the optical element based on the weighted combination occurs when:
  the output of the narrow FOV quadrant photodetector indicates a centroid of the second light is located outside a linear response range of the narrow FOV quadrant photodetector; and
  a sign of the output of the narrow FOV quadrant photodetector and a sign of the output of the wide FOV quadrant photodetector are the same.

19. The method of claim 18, further comprising:
controlling the orientation of the optical element without the output of the wide FOV quadrant photodetector when the output of the narrow FOV quadrant photodetector indicates a centroid of the second light is located within a linear response range of the narrow FOV quadrant photodetector.

20. A non-transitory computer-readable medium comprising:
  computer-readable instructions that, when executed by at least one processor of a computing device, cause the computing device to:
    receive an output from a wide FOV quadrant photodetector generated in response to receiving first light originating from an optical beam provided by an optical element;
    receive an output from a narrow FOV quadrant photodetector generated in response to receiving second light originating from the optical beam; and
    control an orientation of the optical element in a manner that tracks the optical beam during at least a period of time based on a weighted combination of:
      the output received from the wide FOV quadrant photodetector; and
      the output received from the narrow FOV quadrant photodetector.

* * * * *